United States Patent
Ye et al.

(10) Patent No.: US 9,658,903 B2
(45) Date of Patent: May 23, 2017

(54) EVENT PROCESSING METHOD AND APPARATUS

(71) Applicant: Huawei Technologies Co., Ltd., Shenzhen (CN)

(72) Inventors: Kaihe Ye, Shenzhen (CN); Shikai Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/336,194

(22) Filed: Oct. 27, 2016

(65) Prior Publication Data

US 2017/0046209 A1 Feb. 16, 2017

Related U.S. Application Data

(63) Continuation of application No. PCT/CN2015/084477, filed on Jul. 20, 2015.

(30) Foreign Application Priority Data

Feb. 11, 2015 (CN) .......................... 2015 1 0073491

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |
| *G06F 17/30* | (2006.01) |

(52) U.S. Cl.
CPC ........ *G06F 9/542* (2013.01); *G06F 17/30551* (2013.01)

(58) Field of Classification Search
None
See application file for complete search history.

(56) References Cited

U.S. PATENT DOCUMENTS

| | | | |
|---|---|---|---|
| 2011/0202999 A1* | 8/2011 | Logan ................. | G06F 21/6227 726/26 |
| 2012/0030194 A1* | 2/2012 | Jain ....................... | G06F 3/0481 707/722 |
| 2014/0244295 A1* | 8/2014 | Carroll ............... | G06Q 10/0633 705/3 |

* cited by examiner

*Primary Examiner* — Craig Dorais
(74) *Attorney, Agent, or Firm* — Conley Rose, P.C.

(57) ABSTRACT

An event processing method and apparatus which relate to the field of data processing technologies and applicable to a device on which a system having a pattern matching function runs, and reduce memory overheads when a complex event processing (CEP) system performs pattern matching in a complex scenario. The method includes performing, by a state machine instance, matching in a current matching period after an $X^{th}$ event occurs, detecting, by the state machine instance, whether a quantity of events that have currently occurred is greater than 1 when no result indicating successful matching is obtained, and setting a time when an $(X+1)^{th}$ event occurs as a start time of a next matching period when the quantity of events that have currently occurred is greater than 1, and performing matching again in the next matching period.

16 Claims, 7 Drawing Sheets

EVENT PROCESSING METHOD AND APPARATUS

CROSS-REFERENCE TO RELATED APPLICATIONS

This application is a continuation of International Application No. PCT/CN2015/084477, filed on Jul. 20, 2015, which claims priority to Chinese Patent Application No. 201510073491.7, filed on Feb. 11, 2015. The disclosures of the aforementioned applications are hereby incorporated by reference in their entireties.

TECHNICAL FIELD

The present disclosure relates to the field of data processing technologies, and in particular, to an event processing method and apparatus.

BACKGROUND

At present, big data processing technologies have been applied to many fields. In a big data processing scenario in which real-time analysis is required, a commonly used analysis system is a complex event processing (CEP) system. Pattern matching is one of important capabilities of the CEP system, and is mainly used to identify, according to a specific event, a perfect time for service execution in a real-time service scenario. In a matching process, matching is executed by a state machine instance of an event in a sliding window or a batch window. After an event occurs in a window, the CEP system needs to create a state machine instance for the event that occurs, and notify a state machine instance of an existing event in the window, of the event that newly occurs. The sliding window is used as an example. A decision condition of successful matching is that three events continuously occur, where the three events are an event 1, an event 2, and an event 3 according to a time sequence of occurrence. After the event 3 occurs, the CEP system creates a state machine instance corresponding to the event 3, and notifies created state machine instances of the event 1 and the event 2, of the occurrence of the event 3. The state machine instance of the event 1 performs matching, and determines that there are three events that have occurred in the window, and therefore the matching is successful. If the sliding window slides after the event 3 occurs, and the event 1 is out of the sliding window, the state machine instance of the event 2 performs matching, and determines that there are less than three events that have occurred in the window, and therefore the matching fails.

As a real-time service scenario becomes increasingly complex, a length of a window needs to be prolonged to cover more events. For example, a pattern matching function of the CEP system is used to select a user often suffering call drops, and it is determined that matching is successful if more than a specified quantity of call drop events continuously occur during a call. In an actual application, a time when a call drop event occurs is unpredictable, and the call drop event may occur at any time during an entire call. Therefore, in order to ensure that a matching process can cover a call drop event during a call, a length of a window needs to be prolonged to improve coverage of the window for call drop events during the call. However, a longer window may cover more events. If a long window covers a large quantity of events in a matching process, state machine instances that correspond to the events and need to be created by the CEP system increase greatly. Creating a state machine instance needs to occupy some memory resources, and therefore the CEP system needs to occupy a large quantity of memory resources to create the state machine instances for the events in the long matching window, which increases memory overheads when the CEP system performs pattern matching in a complex scenario.

SUMMARY

Embodiments of the present disclosure provide an event processing method and apparatus, which can reduce memory overheads when a CEP system performs pattern matching in a complex scenario.

To achieve the foregoing objective, the following technical solutions are used in the embodiments of the present disclosure.

According to a first aspect, an embodiment of the present disclosure provides an event processing method, where the method includes after the $X^{th}$ event occurs, performing, by a state machine instance, matching in a current matching period, where the state machine instance is configured to match, in one matching period, an event that has occurred with a preset matching rule and obtain a matching result, where the matching result is a result indicating successful matching or a result indicating failed matching, detecting, by the state machine instance, whether a quantity of events that have currently occurred is greater than 1 when no result indicating successful matching is obtained, and using a time when the $(X+1)^{th}$ event occurs as a start time of a next matching period, and performing matching again in the next matching period if the quantity of events that have currently occurred is greater than 1, where the events that have occurred are arranged in sequence as the first event to the $(X+1)^{th}$ event according to a time sequence of occurrence.

With reference to the first aspect, in a first possible implementation manner of the first aspect, the method further includes deleting the event that has currently occurred, and terminating the state machine instance if the quantity of events that have currently occurred is equal to 1.

With reference to the first aspect or the first possible implementation manner of the first aspect, in a second possible implementation manner of the first aspect, the method further includes deleting the event that has currently occurred, and terminating the state machine instance when a result indicating successful matching is obtained.

With reference to any one of the first aspect and the first to second possible implementation manners of the first aspect, in a third possible implementation manner of the first aspect, that no result indicating successful matching is obtained includes that the state machine instance does not obtain the matching result in the current matching period.

With reference to any one of the first aspect and the first to second possible implementation manners of the first aspect, in a fourth possible implementation manner of the first aspect, that no result indicating successful matching is obtained includes that the state machine instance obtains a result indicating failed matching in the current matching period.

With reference to any one of the first aspect and the first to fourth possible implementation manners of the first aspect, in a fifth possible implementation manner of the first aspect, the method further includes creating the state machine instance when the first event occurs.

With reference to any one of the first aspect and the first to fifth possible implementation manners of the first aspect, in a sixth possible implementation manner of the first aspect, the preset matching rule includes at least a quantity of events that have occurred in the one matching period reaches a threshold, and/or a type of an event that has occurred in the one matching period meets a preset type.

With reference to the sixth possible implementation manner of the first aspect, in a seventh possible implementation manner of the first aspect, the preset matching rule is a type of an event that has occurred in the one matching period meets a preset type, and the method further includes detecting, by the state machine instance, whether the quantity of events that have currently occurred exceeds a preset value, and deleting at least one of events recorded by the state machine instance if the quantity of events that have currently occurred exceeds the preset value.

With reference to any one of the first aspect and the first to seventh possible implementation manners of the first aspect, in an eighth possible implementation manner of the first aspect, there is an attribute list in the state machine instance, where the attribute list stores information used for performing matching, and when an event that has occurred is deleted, the method further includes removing information, corresponding to the deleted event and used for performing matching, in the attribute list.

According to a second aspect, an embodiment of the present disclosure provides an event processing apparatus, where the apparatus includes a processing module configured to perform matching in a current matching period after the $X^{th}$ event occurs, where the processing module is further configured to match, in one matching period, an event that has occurred with a preset matching rule and obtain a matching result, where the matching result is a result indicating successful matching or a result indicating failed matching, and a determining module configured to detect whether a quantity of events that have currently occurred is greater than 1 when no result indicating successful matching is obtained, where the processing module is further configured to use a time when the $(X+1)^{th}$ event occurs as a start time of a next matching period, and perform matching again in the next matching period if the quantity of events that have currently occurred is greater than 1, where the events that have occurred are arranged in sequence as the first event to the $(X+1)^{th}$ event according to a time sequence of occurrence.

With reference to the second aspect, in a first possible implementation manner of the second aspect, the processing module is further configured to delete the event that has currently occurred, and terminate a state machine instance if the quantity of events that have currently occurred is equal to 1.

With reference to the second aspect or the first possible implementation manner of the second aspect, in a second possible implementation manner of the second aspect, the processing module is further configured to delete the event that has currently occurred, and terminate the state machine instance when a result indicating successful matching is obtained.

With reference to any one of the second aspect and the first to second possible implementation manners of the second aspect, in a third possible implementation manner of the second aspect, that no result indicating successful matching is obtained includes that the state machine instance does not obtain the matching result in the current matching period.

With reference to any one of the second aspect and the first to second possible implementation manners of the second aspect, in a fourth possible implementation manner of the second aspect, that no result indicating successful matching is obtained includes that the state machine instance obtains a result indicating failed matching in the current matching period.

With reference to any one of the second aspect and the first to fourth possible implementation manners of the second aspect, in a fifth possible implementation manner of the second aspect, the apparatus further includes a creating module configured to create the state machine instance when the first event occurs.

With reference to any one of the second aspect and the first to fifth possible implementation manners of the second aspect, in a sixth possible implementation manner of the second aspect, the preset matching rule includes at least a quantity of events that have occurred in the one matching period reaches a threshold, and/or a type of an event that has occurred in the one matching period meets a preset type.

With reference to the sixth possible implementation manner of the second aspect, in a seventh possible implementation manner of the second aspect, the preset matching rule is a type of an event that has occurred in the one matching period meets a preset type, and the apparatus further includes a detection module configured to detect whether the quantity of events that have currently occurred exceeds a preset value, where the processing module is further configured to delete at least one of events recorded by the state machine instance if the quantity of events that have currently occurred exceeds the preset value.

With reference to any one of the second aspect and the first to seventh possible implementation manners of the second aspect, in an eighth possible implementation manner of the second aspect, there is an attribute list in the state machine instance, where the attribute list stores information used for performing matching, and when an event that has occurred is deleted, the processing module is further configured to remove information, corresponding to the deleted event and used for performing matching, in the attribute list.

According to the event processing method and apparatus provided in the embodiments of the present disclosure, after the $X^{th}$ event occurs, a state machine instance performs matching in a current matching period, when no result indicating successful matching is obtained, and if the state machine instance detects that a quantity of events that have currently occurred is greater than 1, the state machine instance uses a time when the $(X+1)^{th}$ event occurs as a start time of a next matching period, and performs matching again in the next matching period. Compared with the prior art, in the embodiments of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The terms used in the embodiments of the present disclosure are merely for the purpose of describing specific embodiments, and are not intended to limit the present disclosure. The terms "a" and "the" in a singular form used in the embodiments and the appended claims of the present disclosure are also intended to include plural forms, unless otherwise specified in the context clearly. It should also be understood that, the term "and/or" used herein indicates and includes any or all possible combinations of one or more associated listed items. A context is depended on. For example, the term "if" used herein may be explained as "during" or "when" or "response to determining" or "response to detection". Similarly, the term "delete" is often considered as "consume" by a person skilled in the art, that is, a meaning of "deleting an event" should be the same as a meaning of "consuming an event".

The embodiments of the present disclosure may be further implemented on a device on which a system having a pattern matching function runs. A specific type of the device on which a system having a pattern matching function runs is not limited. For example, the device on which a system having a pattern matching function runs may include components such as an input unit, a processor unit, an output unit, a communication unit, and a storage unit. These components communicate using one or more buses. A person skilled in the art may understand that a structure of the device on which a system having a pattern matching function runs does not impose a limitation on the present disclosure. The device may be of a bus-shaped structure or a star-shaped structure, and may include more or less parts, or combine some parts, or have a different parts deployment. In an implementation manner of the present disclosure, the device on which a system having a pattern matching function runs may be any device having data storage, processing, and transmission functions, including but not limited to a blade server, a tower server, a cabinet server, a mobile workstation, a personal computer, a combination of the foregoing two or more items, or the like.

Figure 1:
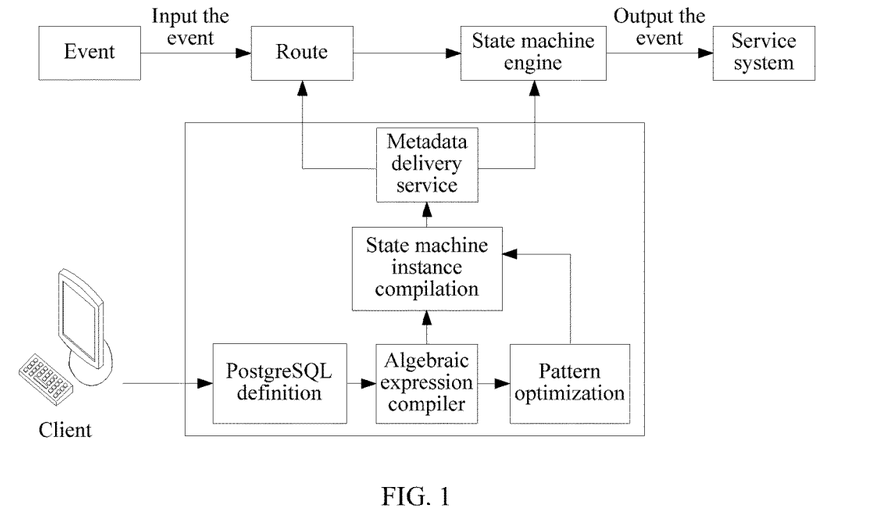
FIG. 1 is a schematic structural diagram of a specific application scenario according to an embodiment of the present disclosure.

As shown in FIG. 1, a system having a pattern matching function may include Pattern Query Language (PQL) definition, an algebraic expression compiler, pattern optimization, state machine instance compilation, a metadata delivery service, a route, and a state machine engine. By defining a PQL, a client adds support for a keyword (SLIDING DISMATCH) to a policy category of the PQL, and identifies the keyword from a pattern matching syntax. The algebraic expression compiler saves the policy category to an algebraic expression as an attribute. A state machine execution procedure is compiled according to a policy in the algebraic expression. The metadata delivery service delivers a compilation result to the route and the state machine engine, where the state machine engine module is mainly configured to manage basic running of a state machine. After an event is input, the event is dumped by the route and then is output to a service system using the state machine engine.

For example, a user defines, using the client, a service mode that needs to be identified. Through the PQL definition, the algebraic expression compiler, the pattern optimization, and the state machine instance compilation, the service mode defined by the user is compiled into state machine instance metadata. The metadata delivery service deploys the state machine instance metadata on the route and the state machine engine module, during running, the route receives an input event and then sends the input event to the state machine engine module, and the state machine engine module delivers the event to a state machine instance corresponding to the event. In the state machine instance, it is determined in real time whether the service mode defined by the user is satisfied, and a new event is output to the third-party service system if the service mode defined by the user is satisfied. A specific compilation process includes the procedures of adding support for a keyword to a policy category of a PQL to enhance the PQL, identifying the keyword from a pattern matching syntax after parsing and conversion, saving the policy category to an algebraic expression as an attribute after conversion once again, and performing, by a state machine instance, sliding on a matching window according to a policy and a policy in the algebraic expression after compilation, where it should be noted that different policies need to be implemented using different state machine instances.

Figure 2:
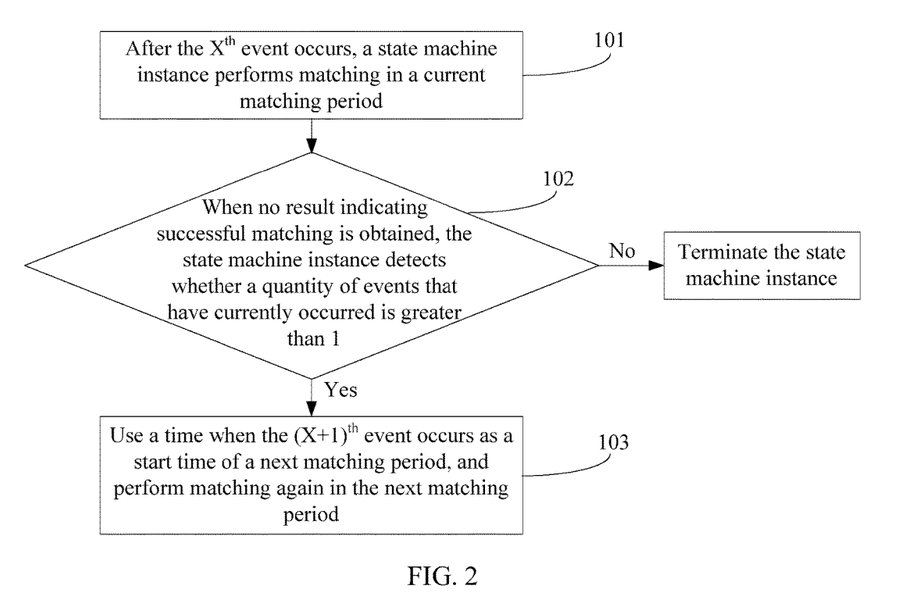
FIG. 2 is a flowchart of an event processing method according to an embodiment of the present disclosure.

An embodiment of the present disclosure provides an event processing method, as shown in FIG. 2, which may include the following steps.

Step 101: After the $X^{th}$ event occurs, a state machine instance performs matching in a current matching period.

The state machine instance is configured to match, in one matching period, an event that has occurred with a preset matching rule and obtain a matching result, where the matching result is a result indicating successful matching or a result indicating failed matching.

In this embodiment, there may be multiple trigger conditions for starting to execute a matching process by a device on which a system having a pattern matching function runs. For example, in a time-based application scenario, when a specified time is reached, a state machine instance corresponding to a time-based matching window is created, and a matching process starts to be executed. For another example, in an event-based application scenario, when the first event occurs, a state machine instance corresponding to an event-based matching window is created, and a matching process starts to be executed. When each event occurs, a state machine instance running on the device on which a system having a pattern matching function runs records the event that occurs, and records related information of the event that occurs into the state machine instance. For example, the state machine instance running on the device on which a system having a pattern matching function runs records a type of the event that occurs into an attribute list. A counter is disposed in the state machine instance, and is configured to count a quantity of events that have occurred. A value on the counter increases by 1 when a new event occurs.

A matching period is used as a limitation on a time period of a matching process. When the matching period is reached, it is considered that the matching process has reached the limited time period. It should be noted that the matching period may be set during service design, and a specific value of the set matching period is read as service-related information when a state machine instance is created, and is used as one of trigger conditions for triggering the state machine instance to execute a detection process. For example, in step 102, a trigger condition for triggering the state machine instance to execute the detection process is that no result indicating successful matching is obtained.

Step 102: When no result indicating successful matching is obtained, the state machine instance detects whether a quantity of events that have currently occurred is greater than 1.

After this matching process starts, a time when the first event occurs is used as a start time of the matching period for detecting whether an event in a window is successfully matched in the matching period. It should be noted that matching is considered to be successful when the event in the matching window meets the preset matching rule. In this embodiment of the present disclosure, a specific matching rule is not limited, and the matching rule may be preset according to a different service need. For example, the preset matching rule includes at least a quantity of events that have occurred in the one matching period reaches a threshold, and/or a type of an event that has occurred in the one matching period meets a preset type.

Step 103: If the quantity of events that have currently occurred is greater than 1, use a time when the $(X+1)^{th}$ event occurs as a start time of a next matching period, and perform matching again in the next matching period.

The events that have occurred are arranged as the first event to the $(X+1)^{th}$ event according to a time sequence of occurrence.

For example, a user starts to make a call, total duration of the call is 30 minutes, and there are a total of three call drop events in the 30 minutes, which occur at the $10^{th}$ minute, the $11^{th}$ minute, and the $15^{th}$ minute separately. In this case, the call drop event occurring at the $10^{th}$ minute may be referred to as an event that has currently occurred, and the call drop event occurring at the $11^{th}$ minute may be referred to as the $(X+1)^{th}$ event. It should be noted that a matching period in which matching is performed on an event that has occurred in a matching window obtained after sliding and the preset matching rule may be same as a matching period in which matching is performed on an event that has occurred in a matching window before sliding and the preset matching rule, or for an event that has occurred in a matching window obtained after sliding and the preset matching rule, a next matching period is reset in a matching process according to a need in a service scenario. For example, the service scenario is that a call drop event is reported if a preset matching rule is met within any 5-minute window. In order to avoid frequent reporting of call drop events, the matching rule is set as that reporting is performed when three or more call drop events occur within the 5-minute window. When matching is performed on an event that has occurred in the window and the preset matching rule, that is, after a matching process starts, a time when the first call drop event occurs is used as a start time of a matching period, and it is detected whether three or more call drop events occur in the 5-minute window in the matching period. If only one or two call drop events occur, or no call drop event occurs in the 5-minute window, the 5-minute window is slid to the second call drop event, and a time when the second call drop event occurs is used as a start time of a next matching period in order to perform matching again on a 5-minute window obtained after sliding.

According to the event processing method provided in this embodiment of the present disclosure, after the $X^{th}$ event occurs, a state machine instance performs matching in a current matching period, when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period. Compared with the prior art, in this embodiment of the present disclosure, in a process of performing matching by a state machine instance, a time when a next event occurs can be used as a start time of a next matching period, and matching is performed again in the next matching period, therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

Figure 3:
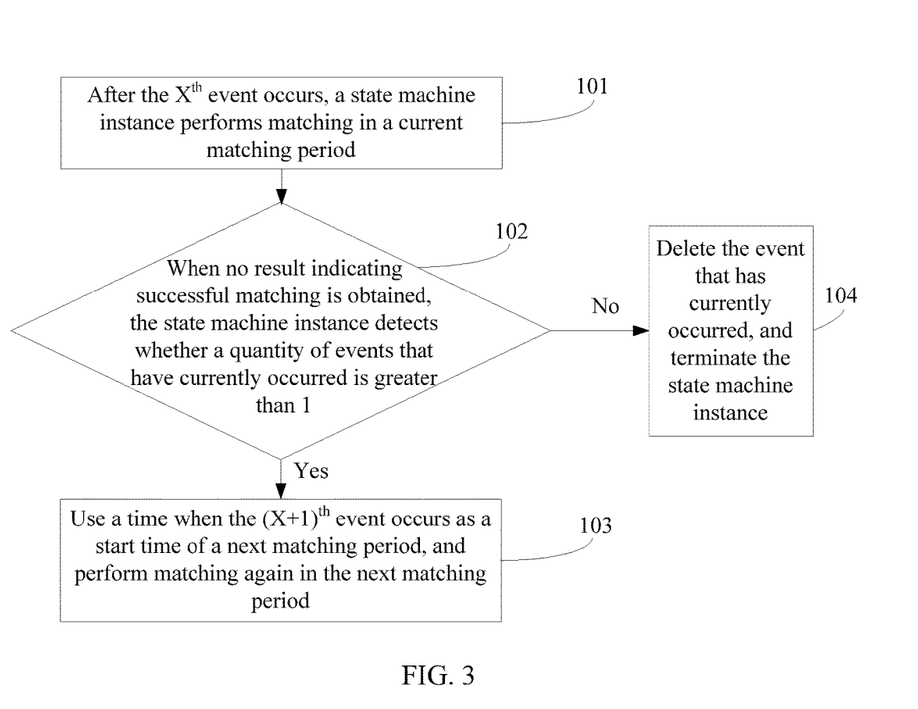
FIG. 3 is a flowchart of another event processing method according to an embodiment of the present disclosure.

In this embodiment of the present disclosure, based on the implementation manner shown in FIG. 2, the method may also be implemented as an implementation manner shown in FIG. 3.

Step 104: If the quantity of events that have currently occurred is equal to 1, delete the event that has currently occurred, and terminate the state machine instance.

If an event that has currently occurred meets a corresponding matching rule, it is considered that matching is performed on the event that has occurred in a matching period and a preset matching rule, and a result indicating successful matching is obtained. In this case, all events that occur in a matching window in the matching period are deleted, and a state machine instance corresponding to the matching window is terminated. When a new event occurs or matching is re-started for a new event in the matching window and the preset matching rule, a new matching window and a state machine instance corresponding to the new matching window are then created.

Figure 4:
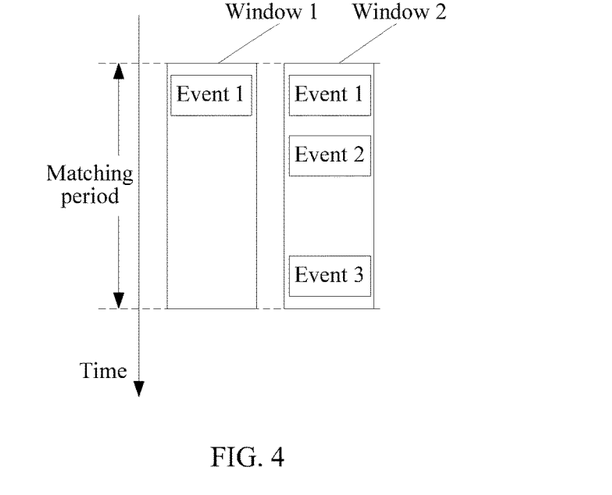
FIG. 4 is a schematic diagram of a specific application scenario according to an embodiment of the present disclosure.

For example, as shown in FIG. 4, the preset matching rule is that two or more events occur. In a matching period, if one event occurs in a window 1, the window 1 does not meet the preset matching rule, and matching is not completed. If three events occur in a window 2, the window 2 meets the preset matching rule, and in this case, all events, that is, an event 1, an event 2, and an event 3, occurring in the window 2 are deleted, and a state machine instance corresponding to the window 2 is terminated.

According to the event processing method provided in this embodiment of the present disclosure, after the $X^{th}$ event occurs, a state machine instance performs matching in a current matching period, when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period, or if the quantity of events that have currently occurred is equal to 1, the event that has currently occurred is deleted, and the state machine instance is terminated. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

Figure 5:
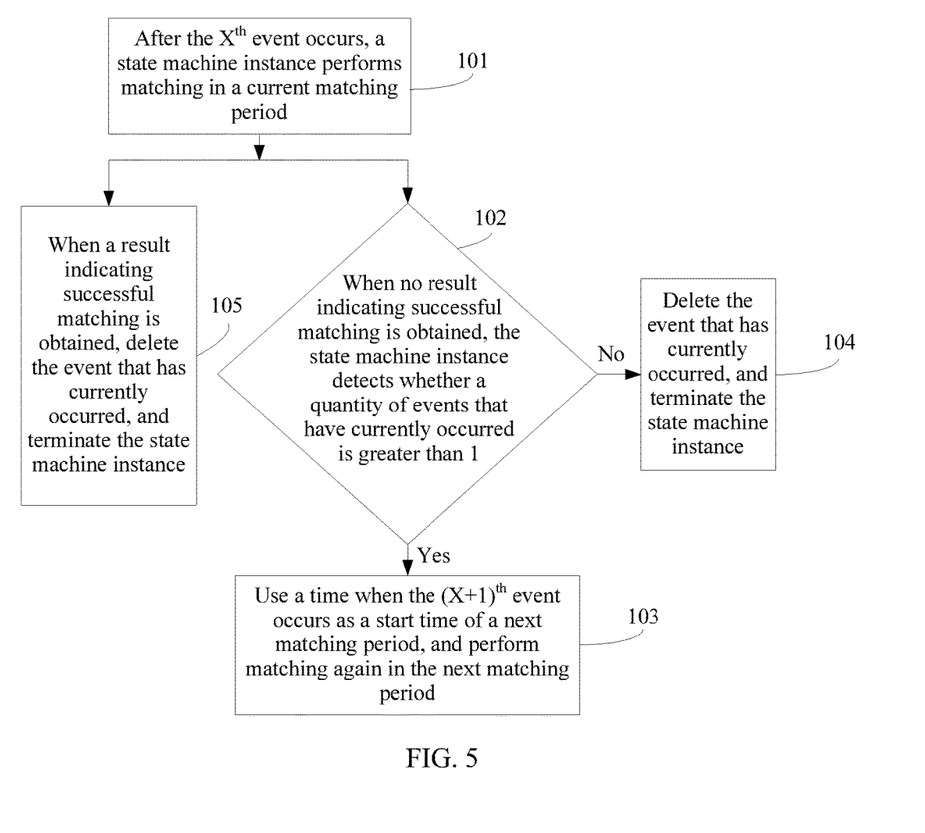
FIG. 5 is a flowchart of another event processing method according to an embodiment of the present disclosure.

In this embodiment of the present disclosure, based on the implementation manner shown in FIG. 2 or FIG. 3, the method may also be implemented as an implementation manner shown in FIG. 5.

Step 105: When a result indicating successful matching is obtained, delete the event that has currently occurred, and terminate the state machine instance.

The foregoing step 102 is performed when no result indicating successful matching is obtained.

According to the event processing method provided in this embodiment of the present disclosure, after the $X^{th}$ event occurs, a state machine instance performs matching in a current matching period; when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period, or when a result indicating successful matching is obtained, the event that has currently occurred is deleted, and the state machine instance is terminated. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

In this embodiment of the present disclosure, that no result indicating successful matching is obtained includes that the state machine instance does not obtain the matching result in the current matching period.

Figure 6:
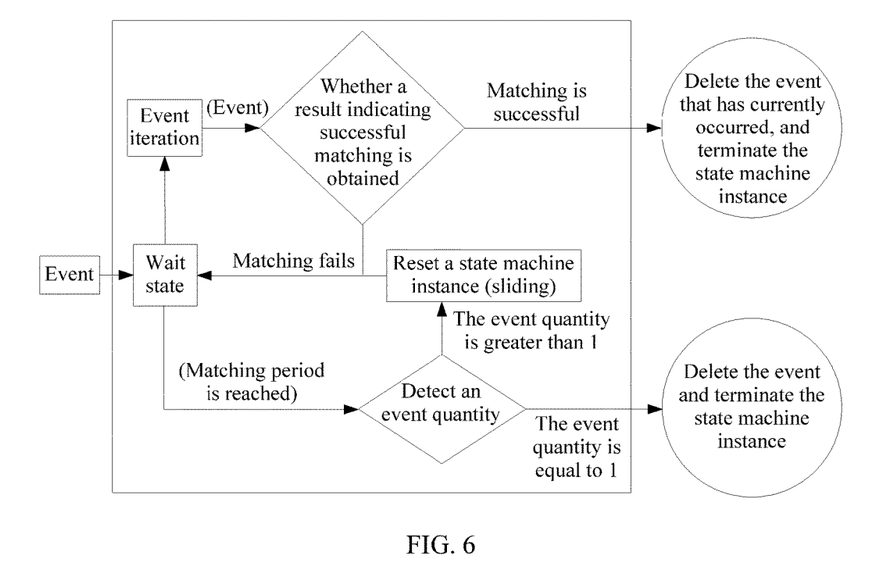
FIG. 6 is a schematic structural diagram of another specific application scenario according to an embodiment of the present disclosure.

For example, as shown in FIG. 6, an implementation procedure in which an event-based matching window slides in a state machine instance is as follows.

After an event occurs, an event quantity is initialized, that is, a current event quantity is 1. It is determined whether a result indicating successful matching is obtained for matching performed on an event in a matching window in a matching period and a preset matching rule, and the event that has currently occurred is deleted and the state machine instance is terminated if the matching is successful, or the state machine instance is reset and then a wait state is entered if the matching fails. The state machine instance detects the event quantity when the matching period is reached, and if the event quantity is equal to 1, the event is deleted and the state machine instance is terminated, or the state machine instance is reset and the wait state is entered if the event quantity is greater than 1. In addition, a start time of a next event that occurs is used as a start time of a next matching period, next, event iteration is performed, that is, the current event quantity is increased by 1, and then matching is performed again.

It should be noted that resetting a state machine instance refers to resetting a state parameter in a state machine, where the state parameter may be a parameter generated in a process of executing a procedure shown in FIG. 6 by the state machine after an event occurs in a matching window, and an attribute list that exists in the state machine instance does not need to be reset.

Figure 7:
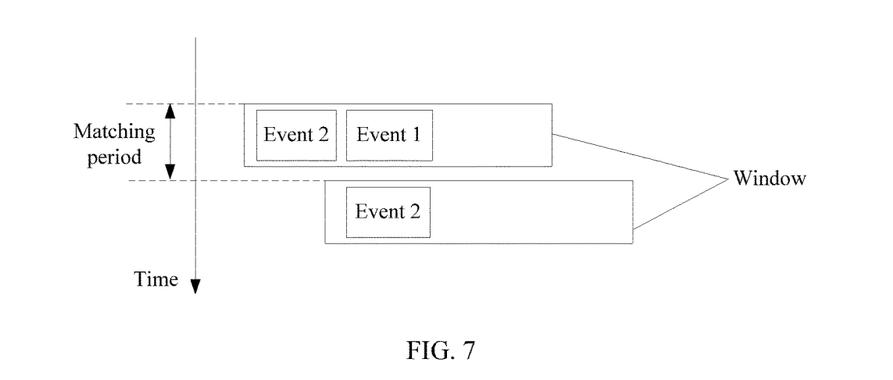
FIG. 7 is a schematic diagram of another specific application scenario according to an embodiment of the present disclosure.

For example, as shown in FIG. 7, if a result indicating failed matching is obtained for matching performed on an event in a window and a preset matching rule, and a matching period is reached, an event that occurs earliest, that is, an event 1 in the window is deleted, and the window slides to a next event, that is, an event 2.

According to the event processing method provided in this embodiment of the present disclosure, after the $X^{th}$ event occurs, a state machine instance performs matching in a current matching period, when the state machine instance does not obtain a matching result in the current matching period, if the state machine instance detects that a quantity of events that have currently occurred is greater than 1, the state machine instance uses a time when the $(X+1)^{th}$ event occurs as a start time of a next matching period, and performs matching again in the next matching period. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

In this embodiment of the present disclosure, that no result indicating successful matching is obtained includes that the state machine instance obtains the result indicating failed matching in the current matching period.

Figure 8:
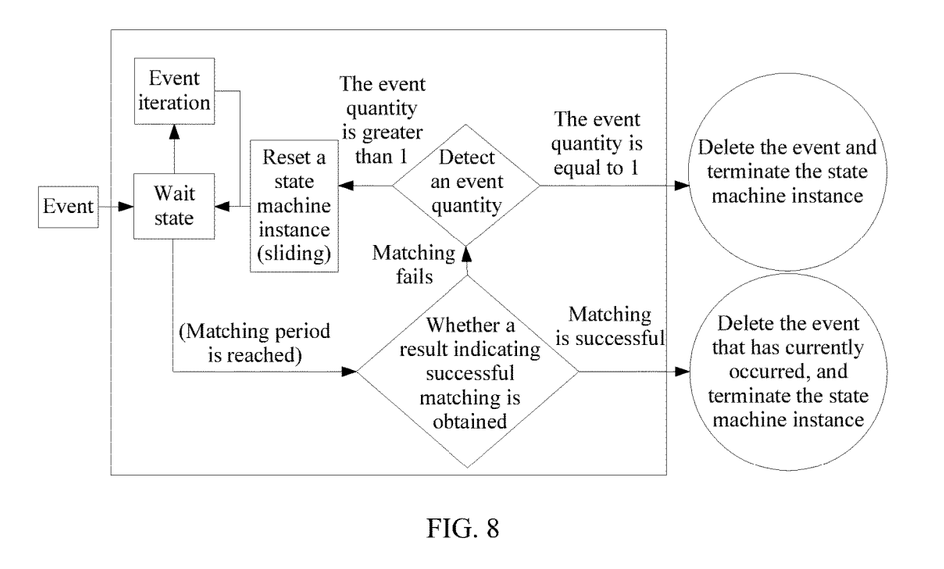
FIG. 8 is a schematic structural diagram of another specific application scenario according to an embodiment of the present disclosure.

For example, as shown in FIG. 8, an implementation procedure in which a time-based matching window slides in a state machine instance is as follows.

After an event occurs, an event quantity is initialized, that is, a current event quantity is 1. When a matching period is reached, it is determined whether a result indicating successful matching is obtained for matching performed on an event in a matching window and a preset matching rule. The event that has currently occurred is deleted and the state machine instance is terminated if the matching is successful, or the state machine instance detects the event quantity if the matching fails. The event is deleted and the state machine instance is terminated if the event quantity is equal to 1, or the state machine instance is reset and a wait state is entered if the event quantity is greater than 1. In addition, a start time of a next event that occurs is used as a start time of a next matching period, and then event iteration is performed, that is, the current event quantity is increased by 1.

Figure 9:
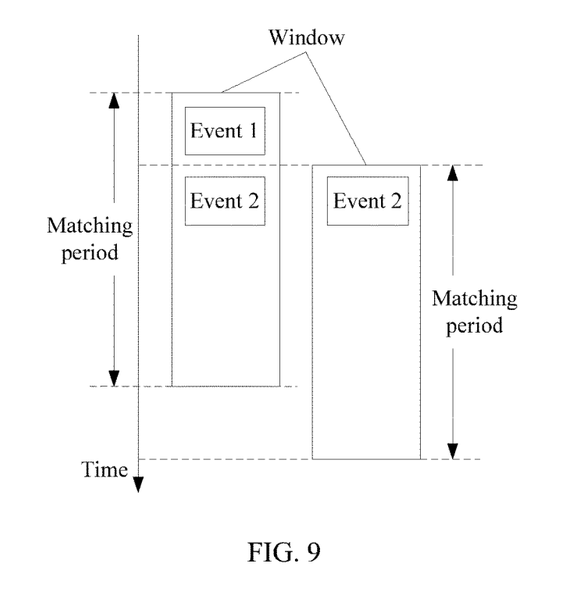
FIG. 9 is a schematic diagram of another specific application scenario according to an embodiment of the present disclosure.

For another example, as shown in FIG. 9, the preset matching rule is that three or more timeout events occur. In a matching period, if two events occur in a window, the window does not meet the matching rule, and matching fails. In this case, the window slides to the second event, that is, an event 2, and a time when the event 2 occurs is used as a start time of a next matching period.

According to the event processing method provided in this embodiment of the present disclosure, after the $X^{th}$ event occurs, a state machine instance performs matching in a current matching period, when the state machine instance obtains a result indicating failed matching in the current matching period, if the state machine instance detects that a quantity of events that have currently occurred is greater than 1, the state machine instance uses a time when the $(X+1)^{th}$ event occurs as a start time of a next matching period, and performs matching again in the next matching period. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

Figure 10:
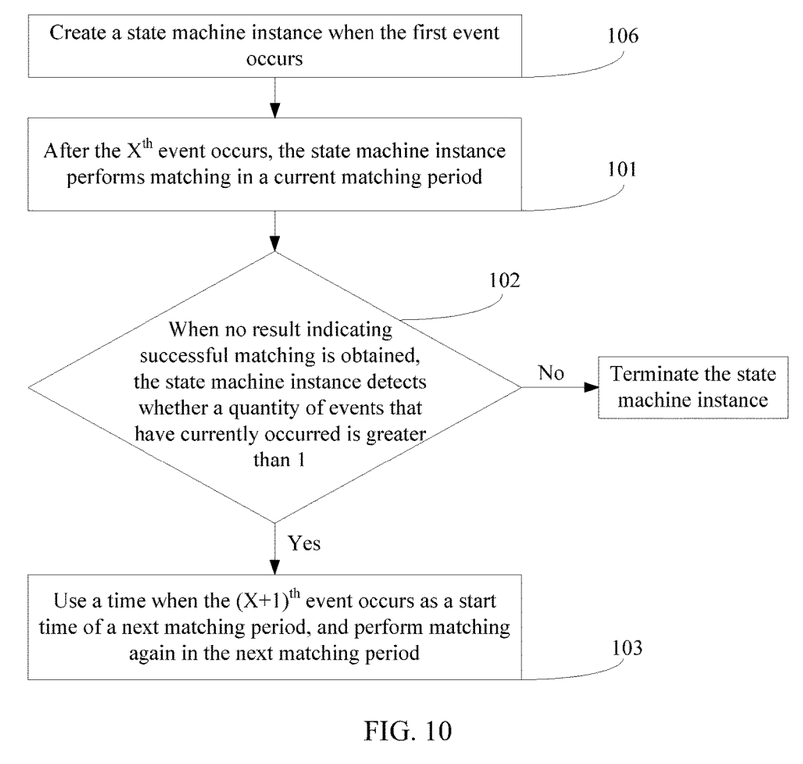
FIG. 10 is a flowchart of another event processing method according to an embodiment of the present disclosure.

In this embodiment of the present disclosure, based on the implementation manner shown in FIG. 2 or FIG. 3, the method may also be implemented as an implementation manner shown in FIG. 10.

Step 106: Create the state machine instance when the first event occurs.

It should be noted that when the $X^{th}$ event is the first event, the state machine instance is first created, and then a matching process is executed using the created state machine instance in each matching period.

According to the event processing method provided in this embodiment of the present disclosure, the state machine instance is created when the first event occurs, and after the $X^{th}$ event occurs, the state machine instance performs matching in a current matching period, when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period. Compared with the prior art, in this embodiment of the present disclosure, the state machine instance may be created when the first event occurs, and in a process of performing matching by the state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

In this embodiment of the present disclosure, the preset matching rule includes at least a quantity of events that have occurred in the one matching period reaches a threshold, and/or a type of an event that has occurred in the one matching period meets a preset type.

In this embodiment of the present disclosure, when a parameter related to an event quantity is not required in the preset matching rule, an event in the state machine instance may be deleted when the quantity of events that have currently occurred exceeds a preset value and in a case in which it is ensured that there is at least one event in the state machine instance. For example, the preset matching rule is a type of an event that has occurred in the one matching period meets a preset type. Based on the implementation manner shown in FIG. 10, the method further includes an implementation manner shown in FIG. 11.

Figure 11:
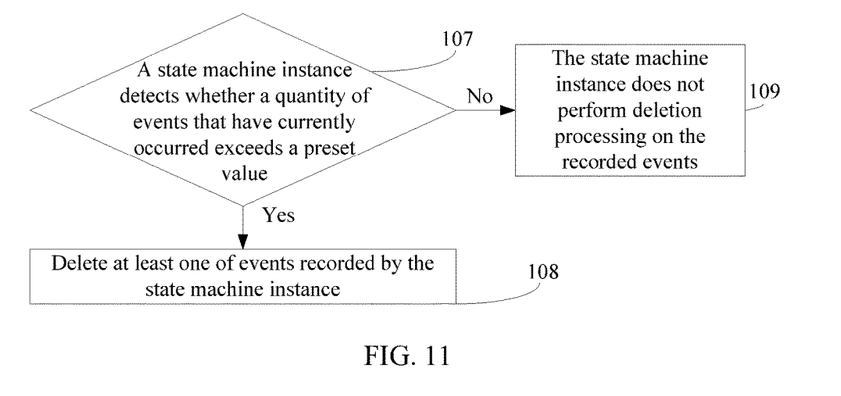
FIG. 11 is a flowchart of another event processing method according to an embodiment of the present disclosure.

Step 107: The state machine instance detects whether the quantity of events that have currently occurred exceeds a preset value.

Step 108: Delete at least one of events recorded by the state machine instance if the quantity of events that have currently occurred exceeds the preset value.

If the quantity of events that have currently occurred exceeds the preset value, an earliest event in the events recorded by the state machine instance, that is, an event in the events that occurs first, may be deleted, a quantity of events executed by the state machine instance is decreased by 1, a start time of the matching period is modified from a time when the first event occurs to a time when the second event occurs, and a quantity of events existing in the matching window is increased by 1. Alternatively, any one or more events in the events recorded by the state machine instance are deleted, and after the any one or more events are deleted, the state machine instance still includes at least one event. It should be noted that when the preset matching rule is that a type of an event that has occurred in the one matching period meets a preset type, because a quantity of events does not affect a matching result of determining whether a type of an event meets the preset type, at least one event recorded by the state machine instance may be deleted.

Step 109: The state machine instance does not perform deletion processing on the recorded events if the quantity of events that have currently occurred does not exceed the preset value.

It should be noted that a user may preset, according to a current service need, a quantity of events that can be accommodated in a matching window in a matching period, that is, a preset value, preset according to the current service need, of a quantity of events that have currently occurred. In a process of performing matching on an event in the matching window in the matching period and a preset matching rule, if the quantity of events that have currently occurred exceeds the preset value, an event recorded by the state machine instance is deleted. For example, if a preset value of an event quantity is 2, and a quantity of events that have currently occurred is greater than 2, an earliest event in the events recorded by the state machine instance, that is, the first event recorded by the state machine instance, may be deleted.

According to the event processing method provided in this embodiment of the present disclosure, after the $X^{th}$ event occurs, a state machine instance performs matching in a current matching period, when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period, and when a parameter related to an event quantity is not required in a preset matching rule, an event in the state machine instance may be deleted when the quantity of events that have currently occurred exceeds a preset value and in a case in which it is ensured that there is at least one event in the state machine instance. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, and when a parameter related to an event quantity is not required in a preset matching rule, an event in the state machine instance may be deleted when a quantity of events that have currently occurred exceeds a preset value and in a case in which it is ensured that there is at least one event in the state machine instance, which reduces memory resources occupied by the event, thereby reducing memory overheads when the CEP system performs pattern matching in the complex scenario.

In this embodiment of the present disclosure, there is an attribute list in the state machine instance, where the attribute list stores information used for performing matching, and when an event that has occurred is deleted, the method further includes removing information, corresponding to the deleted event and used for performing matching, in the attribute list.

It should be noted that an earliest event in the attribute list corresponds to a last attribute in the attribute list. The last attribute in the attribute list is removed at the same time of deleting the earliest event in the events and decreasing the quantity of events executed by the state machine instance by 1.

According to the event processing method provided in this embodiment of the present disclosure, after the $X^{th}$ event occurs, a state machine instance performs matching in a current matching period. when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period. In addition, when an event that has occurred is deleted, information, corresponding to the deleted event and used for performing matching, in an attribute list may be removed. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, and when an event that has occurred is deleted, information, corresponding to the deleted event and used for performing matching, in an attribute list may be removed, which reduces memory resources occupied by the attribute list, thereby reducing memory overheads when the CEP system performs pattern matching in the complex scenario.

Figure 12:
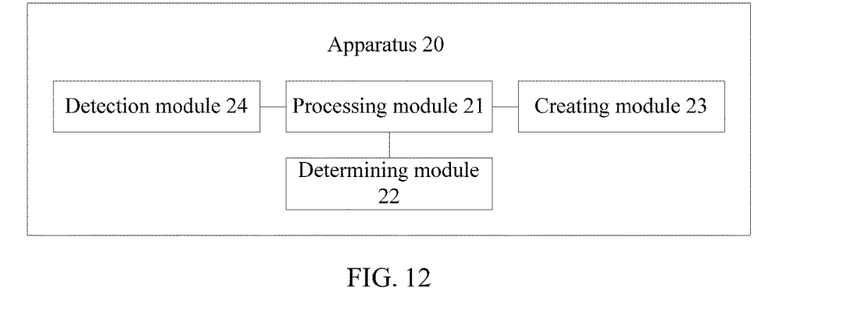
FIG. 12 is a schematic structural diagram of an event processing apparatus according to an embodiment of the present disclosure.

An embodiment of the present disclosure provides an event processing apparatus 20. As shown in FIG. 12, the apparatus 20 may include a processing module 21 configured to perform matching in a current matching period after the $X^{th}$ event occurs, where the processing module 21 is further configured to match, in one matching period, an event that has occurred with a preset matching rule and obtain a matching result, where the matching result is a result indicating successful matching or a result indicating failed matching, and a determining module 22 configured to detect whether a quantity of events that have currently occurred is greater than 1 when no result indicating successful matching is obtained.

The processing module 21 is further configured to if the quantity of events that have currently occurred is greater than 1, use a time when the $(X+1)^{th}$ event occurs as a start time of a next matching period, and perform matching again in the next matching period, where the events that have occurred are arranged as the first event to the $(X+1)^{th}$ event according to a time sequence of occurrence.

In this embodiment of the present disclosure, the processing module 21 is further configured to: if the quantity of events that have currently occurred is equal to 1, delete the event that has currently occurred, and terminate a state machine instance.

In this embodiment of the present disclosure, the processing module 21 is further configured to when a result indicating successful matching is obtained, delete the event that has currently occurred, and terminate the state machine instance.

In this embodiment of the present disclosure, that no result indicating successful matching is obtained includes that the state machine instance does not obtain the matching result in the current matching period.

In this embodiment of the present disclosure, that no result indicating successful matching is obtained includes that the state machine instance obtains the result indicating failed matching in the current matching period.

In this embodiment of the present disclosure, the apparatus 20 further includes a creating module 23 configured to create the state machine instance when the first event occurs.

In this embodiment of the present disclosure, the preset matching rule includes at least a quantity of events that have occurred in the one matching period reaches a threshold, and/or a type of an event that has occurred in the one matching period meets a preset type.

In this embodiment of the present disclosure, the preset matching rule is a type of an event that has occurred in the one matching period meets a preset type, and the apparatus 20 further includes a detection module 24 configured to detect whether the quantity of events that have currently occurred exceeds a preset value.

The processing module 21 is further configured to delete at least one of events recorded by the state machine instance if the quantity of events that have currently occurred exceeds the preset value.

In this embodiment of the present disclosure, there is an attribute list in the state machine instance, where the attribute list stores information used for performing matching, and when an event that has occurred is deleted, the processing module 21 is further configured to remove information, corresponding to the deleted event and used for performing matching, in the attribute list.

According to the event processing apparatus provided in this embodiment of the present disclosure, after the $X^{th}$ event occurs, a state machine instance performs matching in a current matching period, when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

Figure 13:
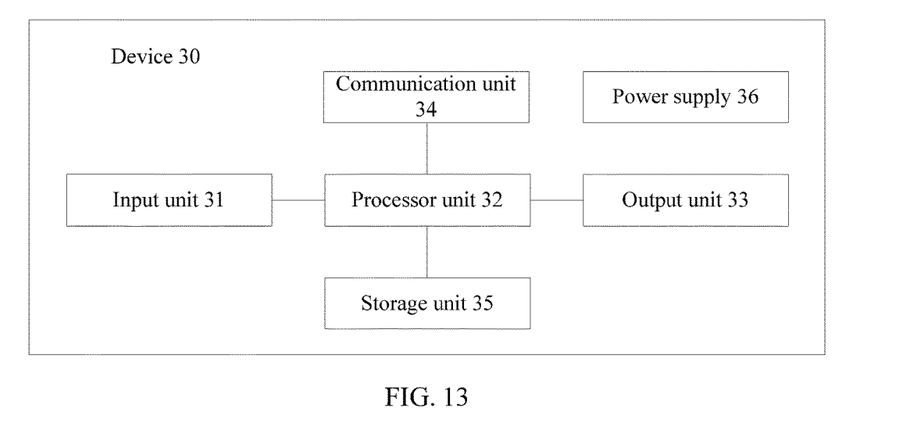
FIG. 13 is a schematic structural diagram of an event processing device according to an embodiment of the present disclosure.

An embodiment of the present disclosure provides an event processing device 30, where the device 30 may be applied to a device on which a system having a pattern matching function runs. FIG. 13 shows a specific possible implementation manner of the device 30, and the device 30 includes components such as an input unit 31, a processor unit 32, an output unit 33, a communication unit 34, and a storage unit 35. These components communicate using one or more buses. A person skilled in the art may understand that a structure of the device 30 shown in the figure does not impose a limitation on the present disclosure. The device may be a bus-shaped structure or a star-shaped structure, and may include parts that are more or less than the parts shown in the figure, or combine some parts, or have a different parts deployment. In an implementation manner of the present disclosure, the device 30 may be any device having data storage, processing, and transmission functions, including but not limited to a blade server, a tower server, a cabinet server, a mobile workstation, a personal computer, a combination of the foregoing two or more items, or the like.

The input unit 31 is configured to implement interaction between an operator and the device 30 and/or information input to the device 30. For example, the input unit 31 may receive digital or character information input by an operator, to generate signal input related to the operator or function control. In a specific implementation manner of the present disclosure, the input unit 31 may be a touch panel, or may be another man-machine interface, for example, an entity input key. In another implementation manner of the present disclosure, an entity input key used as the input unit 31 may include but is not limited to one or more of a physical keyboard, a functional key (such as a volume control button or a switch button), a trackball, a mouse, a joystick, and the like.

The processor unit 32 is a control center of the device 30, is connected to each part of the entire device 30 using various interfaces and lines, and executes various functions of the device 30 and/or process data by running or executing a software program and/or module stored in the storage unit 35 and invoking data stored in the storage unit 35. The processor unit 32 may include an integrated circuit (IC), for example, may include a single encapsulated IC, or may include multiple encapsulated ICs that have same or different functions and that are connected together. For example, the processor unit 32 may include only a central processing unit (CPU), or may be a combination of a CPU, a digital signal processor (DSP), and a control chip (such as a baseband chip) in the communication unit. In an implementation manner of the present disclosure, the CPU may be a single computing core, or may include multiple computing cores.

The communication unit 34 is configured to establish a communication channel such that the device 30 is connected to another device using the communication channel. The device 30 may be a remote server. The communication unit 34 may include communication modules such as a wired local area network module, a wireless local area network (wireless LAN) module, a BLUETOOTH module, and a baseband module. The communication module is configured to control communication between the components in the device 30, and may support direct memory access.

In different implementation manners of the present disclosure, the communication modules in the communication unit 34 are generally presented in a form of integrated circuit chip, and may be selectively combined, without requiring that all the communication modules and corresponding physical cables and antenna groups be included. In some optional implementation manners of the present disclosure, the communication module, for example, the baseband module, in the communication unit 34 may be integrated into the processor unit 32. A typical example is an APQ+ MDM series platform provided by QUALCOMM.

The output unit 33 includes but is not limited to an image output unit and an audio output unit. The image output unit is configured to output text, an image, and/or a video. The image output unit may include a display panel, for example, a display panel configured in a form of a liquid crystal display (LCD), an organic light-emitting diode (OLED), a field emission display (FED), or the like. Alternatively, the image output unit may include a reflective display, for example, an electrophoretic display, or a display using a technology of interferometric modulation of light. The image output unit may include a single display or multiple displays of different dimensions. In a specific implementation manner of the present disclosure, a touch panel used as the input unit 31 may also be used as the display panel of the output unit 33. For example, after detecting a touch operation on or a gesture operation near the touch panel, the touch panel transfers the operation to the processor unit 32, to determine a type of a touch event. After that, the processor unit 32 provides corresponding visual output on the display panel according to the type of the touch event. In FIG. 13, although the input unit 31 and the output unit 33 are used as two separate parts to implement input and output functions of the device 30, in some embodiments, the touch panel and the display panel may be integrated as a whole to implement the input and output functions of the device 30. For example, the image output unit may display various graphical user interfaces (GUI) as virtual control components, including but not limited to a window, a scrollbar, an icon, and a scrapbook, for a user to perform an operation by means of touch. In a specific implementation manner of the present disclosure, the image output unit includes a filter and an amplifier, for performing filtering on and zooming in a video output by the processor unit 32. The audio output unit includes a digital-to-analog converter, for converting an audio signal, output by the processor unit 32, from a digital format to an analog format.

The storage unit 35 may be configured to store a software program and module. The processor unit 32 runs the software program and module stored in the storage unit 35 in order to execute various function applications of the device 30 and implement data processing. The storage unit 35 mainly includes a program storage area and a data storage area, where the program storage area may store an operating system, and an application program required by at least one function, for example, a sound playback program or an image playback program, and the data storage area may store data (for example, audio data or a phone book) created according to use of the device 30, and the like. In a specific implementation manner of the present disclosure, the storage unit 35 may include a volatile memory, for example, a non-volatile random access memory (NVRAM), a phase change random access memory (PRAM), or a magetoresistive random access memory (MRAM), and may further include a non-volatile memory, for example, at least one disk storage device, an electrically erasable programmable read-only memory (EEPROM), or a flash memory device such as a NOR flash memory or a NAND flash memory. The non-volatile memory stores an operating system and an application program that are executed by the processor unit 32. The processor unit 32 loads, from the non-volatile memory, a running program and data to a memory, and stores digital content to a large-capacity storage apparatus. The operating system includes various components and/or drivers that are used to control and manage a routine system task such as memory management, storage device control, and power management and that are helpful for communication between all types of software and hardware. In an implementation manner of the present disclosure, the operating system may be the LINUX system, the iOS system developed by APPLE incorporated, the WINDOWS operating system developed by MICROSOFT, or the like, or may be an embedded operating system such as VXWORKS. The application program includes any application installed on the device 30, including but not limited to a browser, an electronic mail (e-mail), an instant messaging service, word processing, keyboard virtualization, a widget, encryption, digital copyright management, speech recognition, speech duplication, positioning (for example, a function provided by a global positioning system), music playback, and the like.

A power supply 36 is configured to supply power to different parts of the device 30 in order to maintain running of the device 30. As a general understanding, the power supply 36 may be an external power supply that directly supplies power to the device 30, for example, an alternating current (AC) adapter, or may include a built-in battery, for example, a common lithium-ion battery or NiMH battery. In some implementation manners of the present disclosure, the power supply 36 may also be defined more widely, for example, may further include a power management system, a charging system, a power supply fault detection circuit, a power converter or inverter, a power status indicator (for example, a light-emitting diode), and any other component related to electric energy generation, management, and distribution of the device 30.

In this embodiment of the present disclosure, the processor unit 32 is configured to perform, by a state machine instance, matching in a current matching period after the $X^{th}$ event occurs, where the state machine instance is configured to match, in one matching period, an event that has occurred with a preset matching rule and obtain a matching result, where the matching result is a result indicating successful matching or a result indicating failed matching, detect, by the state machine instance, whether a quantity of events that have currently occurred is greater than 1 when no result indicating successful matching is obtained, and if the quantity of events that have currently occurred is greater than 1, use a time when the $(X+1)^{th}$ event occurs as a start time of a next matching period, and perform matching again in the next matching period, where the events that have occurred are arranged as the first event to the $(X+1)^{th}$ event according to a time sequence of occurrence.

In this embodiment of the present disclosure, the processor unit 32 is further configured to if the quantity of events that have currently occurred is equal to 1, delete the event that has currently occurred, and terminate the state machine instance.

In this embodiment of the present disclosure, the processor unit 32 is further configured to when a result indicating successful matching is obtained, delete the event that has currently occurred, and terminate the state machine instance.

In this embodiment of the present disclosure, that no result indicating successful matching is obtained includes that the state machine instance does not obtain the matching result in the current matching period.

In this embodiment of the present disclosure, that no result indicating successful matching is obtained includes that the state machine instance obtains the result indicating failed matching in the current matching period.

In this embodiment of the present disclosure, the processor unit 32 is further configured to create the state machine instance when the first event occurs.

In this embodiment of the present disclosure, the preset matching rule includes at least a quantity of events that have occurred in the one matching period reaches a threshold, and/or a type of an event that has occurred in the one matching period meets a preset type.

In this embodiment of the present disclosure, the preset matching rule is a type of an event that has occurred in the one matching period meets a preset type, and the processor unit 32 is further configured to detect, by the state machine instance, whether the quantity of events that have currently occurred exceeds a preset value, and delete at least one of events recorded by the state machine instance if the quantity of events that have currently occurred exceeds the preset value.

In this embodiment of the present disclosure, there is an attribute list in the state machine instance, where the attribute list stores information used for performing matching, and when an event that has occurred is deleted, the processor unit 32 is further configured to remove information, corresponding to the deleted event and used for performing matching, in the attribute list.

According to the event processing device provided in this embodiment of the present disclosure, after the $X^{th}$ event occurs, a state machine instance performs matching in a current matching period. when no result indicating successful matching is obtained, if the state machine instance detects that a quantity of events that have currently occurred is greater than 1, the state machine instance uses a time when the $(X+1)^{th}$ event occurs as a start time of a next matching period, and performs matching again in the next matching period. Compared with the prior art, in this embodiment of the present disclosure, in a process of performing matching by a state machine instance, a time when a next event occurs can be used as a start time of a next matching period, and matching is performed again in the next matching period. Therefore, by means of repeated execution of the matching process, matching can be performed on all events in a sliding window using only one state machine instance. Moreover, because a start time of each matching period is a start time of each event, the sliding window slides based on a start time of each event that has occurred, which avoids a problem of event missing in a sliding process of the sliding window in a complex scenario. Therefore, when pattern matching is performed in a complex scenario, a CEP system does not need to create a state machine instance for each event, but only needs one state machine instance to perform matching. Moreover, missing an event in the complex scenario is avoided and memory resources occupied for creating multiple state machine instances are reduced, thereby reducing memory overheads when the CEP system performs pattern matching in the complex scenario.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly, and for related parts, reference may be made to partial descriptions in the method embodiment.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a read-only memory (ROM), or a random access memory (RAM).

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An event processing method, comprising:
performing, by a state machine instance, matching in a current matching period after an $X^{th}$ event occurs, wherein the state machine instance is configured to match, in one matching period, an event that has occurred with a preset matching rule and obtain a matching result, and wherein the matching result is a result indicating successful matching or a result indicating failed matching;
detecting, by the state machine instance, whether a quantity of events that have currently occurred is greater than 1 when no result indicating successful matching is obtained;
setting a time when an $(X+1)^{th}$ event occurs as a start time of a next matching period when the quantity of events that have currently occurred is greater than 1; and
performing matching again in the next matching period, wherein the events that have occurred are arranged as a first event to the $(X+1)^{th}$ event according to a time sequence of occurrence.

2. The method according to claim 1, wherein when the quantity of events that have currently occurred is equal to 1, the method further comprises:
deleting the event that has currently occurred; and
terminating the state machine instance.

3. The method according to claim 1, wherein when the result indicating successful matching is obtained, the method further comprises:
deleting the event that has currently occurred; and
terminating the state machine instance.

4. The method according to claim 1, wherein that no result indicating successful matching is obtained comprises the state machine instance does not obtain the matching result in the current matching period, or the state machine instance obtains the result indicating failed matching in the current matching period.

5. The method according to claim 1, further comprising creating the state machine instance when the first event occurs.

6. The method according to claim 1, wherein the preset matching rule comprises at least one of: the quantity of events that have occurred in the one matching period reaches a threshold, or a type of an event that has occurred in the one matching period meets a preset type.

7. The method according to claim 6, wherein the preset matching rule is a type of an event that has occurred in the one matching period meets a preset type, and wherein the method further comprises:
detecting, by the state machine instance, whether the quantity of events that have currently occurred exceeds a preset value; and
deleting at least one of events recorded by the state machine instance when the quantity of events that have currently occurred exceeds the preset value.

8. The method according to claim 1, wherein there is an attribute list in the state machine instance, wherein the attribute list stores information used for performing matching, and wherein when an event that has occurred is deleted, the method further comprises removing information, corresponding to the deleted event and used for performing matching, in the attribute list.

9. An event processing apparatus, comprising:
a processor; and
a computer-readable storage medium coupled to the processor and configured to store programming instructions for execution by the processor, wherein the programming instructions instruct the processor to:
perform matching in a current matching period after an $X^{th}$ event occurs;
match, in one matching period, an event that has occurred with a preset matching rule and obtain a matching result, wherein the matching result is a result indicating successful matching or a result indicating failed matching;
detect whether a quantity of events that have currently occurred is greater than 1 when no result indicating successful matching is obtained;
set a time when an $(X+1)^{th}$ event occurs as a start time of a next matching period when the quantity of events that have currently occurred is greater than 1; and
perform matching again in the next matching period, wherein the events that have occurred are arranged as a first event to the $(X+1)^{th}$ event according to a time sequence of occurrence.

10. The apparatus according to claim 9, wherein when the quantity of events that have currently occurred is equal to 1, the processor is further configured to:
delete the event that has currently occurred; and
terminate a state machine instance.

11. The apparatus according to claim 9, wherein when the result indicating successful matching is obtained, the processor is further configured to:
delete the event that has currently occurred; and
terminate a state machine instance.

12. The apparatus according to claim 9, wherein that no result indicating successful matching is obtained comprises a state machine instance does not obtain the matching result in the current matching period, or the state machine instance obtains the result indicating failed matching in the current matching period.

13. The apparatus according to claim 9, wherein the processor is further configured to create a state machine instance when the first event occurs.

14. The apparatus according to claim 9, wherein the preset matching rule comprises at least one of: the quantity of events that have occurred in the one matching period reaches a threshold, or a type of an event that has occurred in the one matching period meets a preset type.

15. The apparatus according to claim 14, wherein the preset matching rule is the type of the event that has occurred in the one matching period meets the preset type, and wherein the processor is further configured to:
detect whether the quantity of events that have currently occurred exceeds a preset value; and
delete at least one of events recorded by a state machine instance when the quantity of events that have currently occurred exceeds the preset value.

16. The apparatus according to claim 9, wherein there is an attribute list in a state machine instance, wherein the attribute list stores information used for performing matching, and wherein when an event that has occurred is deleted, the processor is further configured to remove information, corresponding to the deleted event and used for performing matching, in the attribute list.

* * * * *